(12) United States Patent
Ohno

(10) Patent No.: US 12,093,691 B2
(45) Date of Patent: Sep. 17, 2024

(54) LOOP UNROLLING PROCESSING APPARATUS, METHOD, AND PROGRAM

(71) Applicant: NEC Corporation, Tokyo (JP)

(72) Inventor: Yoshiyuki Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 17/795,952

(22) PCT Filed: Feb. 14, 2020

(86) PCT No.: PCT/JP2020/005891
§ 371 (c)(1),
(2) Date: Jul. 28, 2022

(87) PCT Pub. No.: WO2021/161532
PCT Pub. Date: Aug. 19, 2021

(65) Prior Publication Data
US 2023/0161590 A1 May 25, 2023

(51) Int. Cl.
*G06F 9/44* (2018.01)
*G06F 9/06* (2006.01)
(Continued)

(52) U.S. Cl.
CPC ............ *G06F 9/325* (2013.01); *G06F 9/3001* (2013.01); *G06F 8/40* (2013.01); *G06F 8/443* (2013.01); *G06F 8/4441* (2013.01); *G06F 8/452* (2013.01)

(58) Field of Classification Search
CPC ........ G06F 9/325; G06F 9/3001; G06F 8/443; G06F 8/452; G06F 8/4441; G06F 8/40
See application file for complete search history.

(56) References Cited

U.S. PATENT DOCUMENTS 6,035,125 A * 3/2000 Nguyen ................. G06F 8/452
  717/160
2006/0048122 A1* 3/2006 Barton .................... G06F 8/443
  717/160

(Continued)

FOREIGN PATENT DOCUMENTS

JP    H04-344535 A    12/1992
JP    2017-041085 A    2/2017

OTHER PUBLICATIONS

Srikanth Kurra et al., The Impact of Loop Unrolling on Controller Delay in High Level Synthesis, 2007, [Retrieved on Apr. 8, 2024]. Retrieved from the internet: <URL: https://ieeexplore.ieee.org/stamp/stamp.jsp?arnumber=4211828> 6 Pages (1-6) (Year: 2007).*

(Continued)

*Primary Examiner* — Anibal Rivera
(74) *Attorney, Agent, or Firm* — Sughrue Mion, PLLC

(57) ABSTRACT

A generation unit generates arithmetic expressions. Here, N denotes the number of looping times of the loop processing. L denotes a designated lower limit of unroll stage number. M denotes a designated upper limit of the unroll stage number. Q denotes a quotient obtained by dividing N by L. R denotes a remainder obtained by dividing N by L. The arithmetic expressions include an arithmetic expression that represents executing loop processing whose number of looping times is a quotient obtained by dividing R by (M−L), with the unroll stage number M when R−Q*(M−L)>0 is not satisfied, and then executing, when a remainder obtained by dividing R by (M−L) is other than 0, processing of one loop with sum of the remainder and L as the unroll stage number, and then executing loop processing with the unroll stage number L.

4 Claims, 10 Drawing Sheets

(51) Int. Cl.
 *G06F 9/30* (2018.01)
 *G06F 9/32* (2018.01)
 *G06F 8/40* (2018.01)
 *G06F 8/41* (2018.01)

(56) References Cited

U.S. PATENT DOCUMENTS

| | | | | |
|---|---|---|---|---|
| 2011/0238948 A1* | 9/2011 | Vorbach | .............. | G06F 15/7867 |
| | | | | 712/15 |
| 2013/0125097 A1* | 5/2013 | Ebcioglu | ............... | G06F 30/323 |
| | | | | 717/136 |
| 2014/0007061 A1* | 1/2014 | Perkins | ................... | G06F 8/443 |
| | | | | 717/150 |

OTHER PUBLICATIONS

International Search Report for PCT Application No. PCT/JP2020/005891, mailed on Apr. 21, 2020.

* cited by examiner

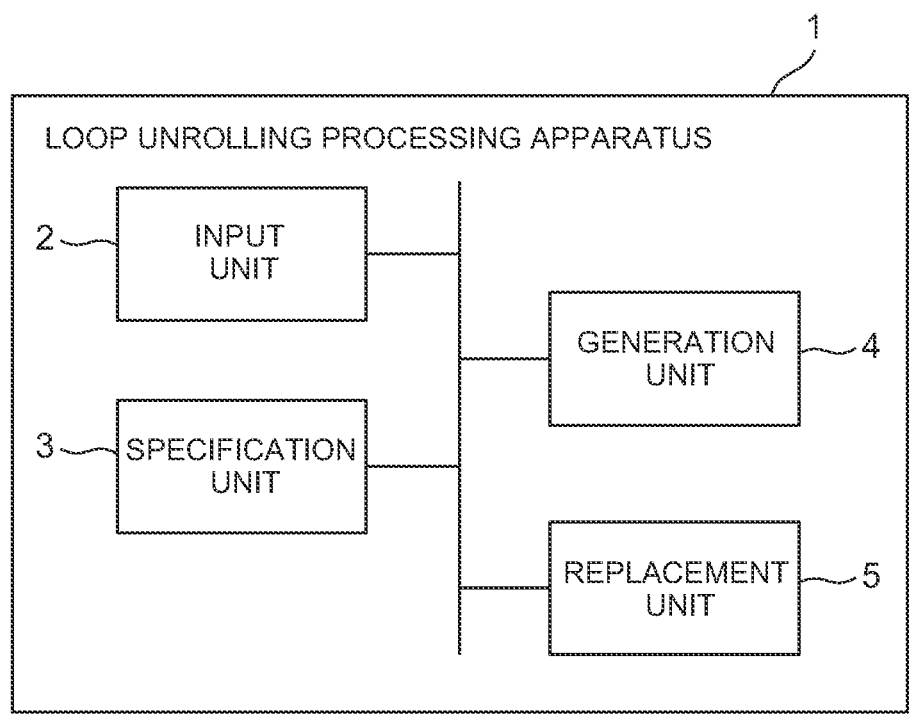

FIG. 3

```
if( N < 4 ){                                  ⎫
   for( i = 0; i < N; i++ ){                  ⎬ X1
      A[i] = B[i] + C[i];                     ⎪
   }                                          ⎭
}
else {                                        ⎫
   i=0;                                       ⎪
   switch( N % 4 ){                           ⎪
   case 1 : /* unroll stage number 5 */       ⎪
   {                                          ⎪
      A[i+0] = B[i+0] + C[i+0] ; A[i+1] = B[i+1] + C[i+1] ; A[i+2] = B[i+2] + C[i+2] ; A[i+3] = B[i+3] + C[i+3] ;   ⎪
      A[i+4] = B[i+4] + C[i+4] ; i+=5 ;       ⎪
   }                                          ⎪
   break ;                                    ⎪
   case 2 : /* unroll stage number 6 */       ⎪
   {                                          ⎬ X2
      A[i+0] = B[i+0] + C[i+0] ; A[i+1] = B[i+1] + C[i+1] ; A[i+2] = B[i+2] + C[i+2] ; A[i+3] = B[i+3] + C[i+3] ;   ⎪
      A[i+4] = B[i+4] + C[i+4] ; A[i+5] = B[i+5] + C[i+5] ; i+=6                       ⎪
   }                                          ⎪
   break ;                                    ⎪
   case 3 : /* unroll stage number 7 */       ⎪
   {                                          ⎪
      A[i+0] = B[i+0] + C[i+0] ; A[i+1] = B[i+1] + C[i+1] ; A[i+2] = B[i+2] + C[i+2] ; A[i+3] = B[i+3] + C[i+3] ;   ⎪
      A[i+4] = B[i+4] + C[i+4] ; A[i+5] = B[i+5] + C[i+5] ; A[i+6] = B[i+6] + C[i+6] ; i+=7 ;                       ⎪
   }                                          ⎪
   break ;                                    ⎪
   default : break ;                          ⎪
   }                                          ⎭
   for( ; i<N ; i+=4 ){                       ⎫
      A[i+0] = B[i+0] + C[i+0] ; A[i+1] = B[i+1] + C[i+1] ; A[i+2] = B[i+2] + C[i+2] ; A[i+3] = B[i+3] + C[i+3] ;   ⎬ X3
   }                                          ⎭
}
```

FIG. 6

| UNROLL STAGE NUMBER | PROCESSING TIME |
|---|---|
| 1 | 4 |
| 2 | 4 |
| 3 | 4 |
| 4 | 4 |
| 5 | 5 |
| 6 | 6 |
| 7 | 7 |

FIG. 7

```
#pragma unroll(8,11)
for (i = 0; i < N; i++ ) {
   A[i] = B[i] + C[i] ;
}
```

S = R - Q * (M-L)
if( S > 0 ) {
  for(i=0; i<S; i++) A[i] = B[i] + C[i] ;    } Y11    }
  /* unroll stage number M */                         } Y1
  for(i=S; i<N; i+=M) {
    ...                                      } Y12
  }
}
else {
  i=0;
  /* unroll stage number M */
  for(j=0; j<R/(M-L); j++) {
    ...                                      } Y21
    i+=M ;
  } switch( R % (M-L) ) {
  case 1 : /* unroll stage number L+1 */
    {...} i+=L+1;
  case 2 : /* unroll stage number L+2 */     } Y22    } Y2
    {...} i+=L+2 ;
  ..
  }

/* unroll stage number L */
  for( ; i<N; i+=L) {
    ...                                      } Y23
  }
}
```

EXAMPLE WHEN N=7, L=4, M=6, Q=1, R=3

FIG. 12
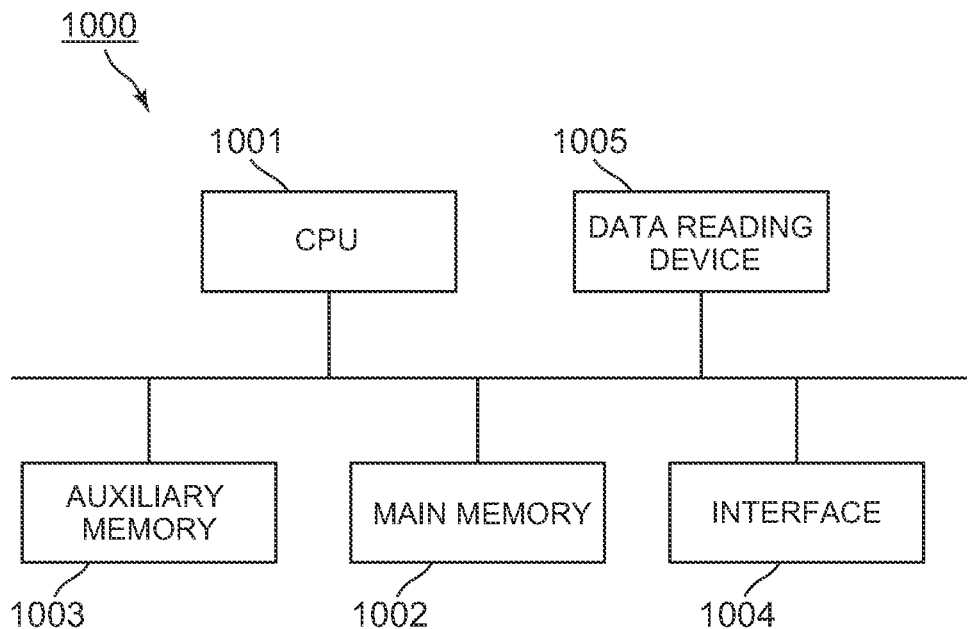
FIG. 13
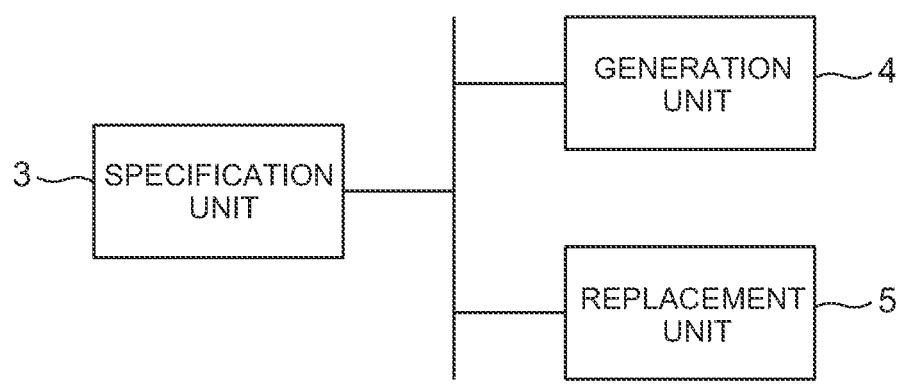
FIG. 14
```
for (i = 0; i < 10000 ; i++) {
   A[i] = B[i/2] + C[i] ;
}
```

```
for ( i = 0; i < 10000 ; i+=4 ) {
  A[i]   = B[(i+0)/2] + C[i+0] ;
  A[i+1] = B[(i+1)/2] + C[i+1] ;
  A[i+2] = B[(i+2)/2] + C[i+2] ;
  A[i+3] = B[(i+3)/2] + C[i+3] ;
}
```

```
for ( j = 0; j < 10000/4 ; j++ ) {
  A[4*j+0] = B[(4*j+0)/2] + C[4*j+0] ;
  A[4*j+1] = B[(4*j+1)/2] + C[4*j+1] ;
  A[4*j+2] = B[(4*j+2)/2] + C[4*j+2] ;
  A[4*j+3] = B[(4*j+3)/2] + C[4*j+3] ;
}
```

FIG. 18

```
for (i = 0; i < N; i++ ) {
   A[i] = B[i] + C[i] ;
}
```

```
for(i=0; i<N%4; i++) {        ⎫
   A[i] = B[i] + C[i] ;       ⎬ A1
}                             ⎭
for( ; i<n; i+=4) {           ⎫
   A[i+0] = B[i+0] + C[i+0] ; │
   A[i+1] = B[i+1] + C[i+1] ; ⎬ A2
   A[i+2] = B[i+2] + C[i+2] ; │
   A[i+3] = B[i+3] + C[i+3] ; │
}                             ⎭
```

LOOP UNROLLING PROCESSING APPARATUS, METHOD, AND PROGRAM

This application is a National Stage Entry of PCT/JP2020/005891 filed on Feb. 14, 2020, the contents of all of which are incorporated herein by reference, in their entirety.

TECHNICAL FIELD

The present invention relates to a loop unrolling processing apparatus, a loop unrolling processing method, and a loop unrolling processing program that performs loop unrolling for loop processing described in a source program.

BACKGROUND ART

Loop unrolling is processing of decreasing the number of looping times in loop processing from original loop processing by increasing the number of processes per one loop.

Loop unrolling decreases the number of looping times. Therefore, the number of determination processes to determine whether or not the loop processing has terminated is also decreased, resulting in a reduction of an overhead caused by the determination processing.

As described above, loop unrolling increases the number of processes per one loop. A value indicating how many times the processing per one loop in the case of increased processing is equivalent to the processing per one loop in the original loop processing is called as an unroll stage number.

The following are specific examples of loop unrolling. FIG. 14 shows an example of the original loop processing subject to loop unrolling. In the loop processing shown in FIG. 14, the number of looping times is 1000.

When the value in parentheses representing an array is not an integer, the value in parentheses is considered an integer by truncating to the decimal point.

FIG. 15 shows an example of a result of loop unrolling for the loop processing shown in FIG. 14 with the unroll stage number 4. In the processing shown in FIG. 15, the processing per one loop is increased from the processing per one loop shown in FIG. 14, and the number of looping times is decreased to 10000/4=2500. In the example shown in FIG. 15, the loop processing is executed while increasing the value of i by 4.

The result of loop unrolling are not limited to one type. FIG. 16 shows another example of a result of loop unrolling for the loop processing shown in FIG. 14 with the unroll stage number 4. In the example shown in FIG. 16, the number of looping times is also decreased to 10000/4=2500. In the example shown in FIG. 16, the loop processing is executed while increasing the value of j by 1.

In the examples shown in FIG. 15 and FIG. 16, the number of looping times is decreased compared to the loop processing shown in FIG. 14, so the overhead caused by the determination processing to determine whether or not the loop processing has terminated.

As mentioned above, when the value in parentheses representing an array is not an integer, the value in parentheses is considered an integer by truncating to the decimal point. Thus, in the example shown in FIG. 16, B[(4*j+0)/2] and B[(4*j+1)/2] are the same value. Similarly, in the example shown in FIG. 16, B[(4*j+2)/2] and B[(4*j+3)/2] are same value. Thus, for example, after reading the values of B[(4*j+0)/2] and C[4*j+0] and calculating A[4*j+0]=B[(4*j+0)/2]+C[4*j+0], when calculating A[4*j+1]=B[(4*j+1)/2]+C[4*j+1], B[(4*j+1)/2] does not need to be read in.

FIG. 17 is a schematic diagram showing a trend in the relationship between the unroll stage number and a performance of the program when loop unrolling is performed. One specific example of the performance is the processing time of the loop processing when loop unrolling is performed. In this case, the shorter the processing time of loop processing, the better the performance, and the longer the processing time, the worse the performance.

As shown in FIG. 17, in general, as the unroll stage number is increased, the performance also increases. However, the performance deteriorates when the unroll stage number is increased too much. The reason why the performance deteriorates when the unroll stage number is increased too much is thought to be that the amount of processing per one loop becomes too large, causing the register capacity to become insufficient and increasing the data to be transferred from the register to memory.

Patent literature 1 describes a technique to separate and expand loops whose number is a remainder which is the number of looping times of original loop processing divided by a loop expansion count, and loops for remaining number. The "expansion" described in patent literature 1 refers to loop unrolling, and the "loop expansion count" described in patent literature 1 refers to the unroll stage number. A specific example of the above technique described in patent literature 1 is shown in FIG. 18.

The upper row in FIG. 18 represents the original loop processing, and the lower row in FIG. 18 represents a result of applying the above technique described in patent literature 1 to the loop processing. The arithmetic expression A1 shown in FIG. 18 represents a loop of the remainder which is the number of looping times N of original loop processing divided by a loop expansion count (i.e., the unroll stage number; in this example, 4). The "%" in arithmetic expression A1 represents the operation to derive the remainder of the division. The arithmetic expression A2 shown in FIG. 18 represents loop processing for remaining number of times.

CITATION LIST

Patent Literature

PTL 1: Japanese Patent Application Laid-Open No. Hei4-344535

SUMMARY OF INVENTION

Technical Problem

There is still room for more efficient processing after loop unrolling in the above technique described in patent literature 1. In the loop processing shown by the arithmetic expression A1 in FIG. 18, the unroll stage number is one. In other words, in the loop processing shown by arithmetic expression A1, the amount of processing per one loop is the same as the amount of processing per one loop in the original loop processing (see the upper row of FIG. 18), and the "N %4" times of loop processing represented by the arithmetic expression A1 incur same amount overhead as same number of times of loop processing in the original loop processing.

Therefore, the purpose of the present invention is to provide a loop unrolling processing apparatus, a loop unrolling processing method, and a loop unrolling processing program that can make processing after loop unrolling more efficient.

Solution to Problem

A loop unrolling processing apparatus according to the present invention includes a specification unit that specifies a description part of an arithmetic expression that represents loop processing from an input source program; a generation unit that generates arithmetic expressions, where N denotes the number of looping times of the loop processing, L denotes a designated lower limit of unroll stage number, M denotes a designated upper limit of the unroll stage number, Q denotes a quotient obtained by dividing N by L, and R denotes a remainder obtained by dividing N by L, wherein the arithmetic expressions include: an arithmetic expression that represents executing processing corresponding to one loop of the loop processing R−Q*(M−L) times when R−Q*(M−L)>0, and then executing loop processing with the unroll stage number M, and an arithmetic expression that represents executing loop processing whose number of looping times is a quotient obtained by dividing R by (M−L), with the unroll stage number M when R−Q*(M−L)>0 is not satisfied, and then executing, when a remainder obtained by dividing R by (M−L) is other than 0, processing of one loop with sum of the remainder and L as the unroll stage number, and then executing loop processing with the unroll stage number L; and a replacement unit that replaces the arithmetic expression of the description part specified by the specification unit with the arithmetic expressions generated by the generation unit.

A loop unrolling processing method according to the present invention includes specifying a description part of an arithmetic expression that represents loop processing from an input source program; generating arithmetic expressions, where N denotes the number of looping times of the loop processing, L denotes a designated lower limit of unroll stage number, M denotes a designated upper limit of the unroll stage number, Q denotes a quotient obtained by dividing N by L, and R denotes a remainder obtained by dividing N by L, wherein the arithmetic expressions include: an arithmetic expression that represents executing processing corresponding to one loop of the loop processing R−Q*(M−L) times when R−Q*(M−L)>0, and then executing loop processing with the unroll stage number M, and an arithmetic expression that represents executing loop processing whose number of looping times is a quotient obtained by dividing R by (M−L), with the unroll stage number M when R−Q*(M−L)>0 is not satisfied, and then executing, when a remainder obtained by dividing R by (M−L) is other than 0, processing of one loop with sum of the remainder and L as the unroll stage number, and then executing loop processing with the unroll stage number L; and replacing the arithmetic expression of the description part with the generated arithmetic expressions.

A loop unrolling processing program according to the present invention causes a computer to execute a generation process of generating arithmetic expressions, where N denotes the number of looping times of the loop processing, L denotes a designated lower limit of unroll stage number, M denotes a designated upper limit of the unroll stage number, Q denotes a quotient obtained by dividing N by L, and R denotes a remainder obtained by dividing N by L, wherein the arithmetic expressions include: an arithmetic expression that represents executing processing corresponding to one loop of the loop processing R−Q*(M−L) times when R−Q*(M−L)>0, and then executing loop processing with the unroll stage number M, and an arithmetic expression that represents executing loop processing whose number of looping times is a quotient obtained by dividing R by (M−L), with the unroll stage number M when R−Q*(M−L)>0 is not satisfied, and then executing, when a remainder obtained by dividing R by (M−L) is other than 0, processing of one loop with sum of the remainder and L as the unroll stage number, and then executing loop processing with the unroll stage number L; and a replacement process of replacing the arithmetic expression of the description part specified in the specification process with the arithmetic expressions generated in the generation process.

Advantageous Effects of Invention

According to the present invention, it is possible to make processing after loop unrolling more efficient.

BRIEF DESCRIPTION OF DRAWINGS

FIG. 1 It depicts a block diagram representing an example of a loop unrolling processing apparatus of the first example embodiment of the present invention.

FIG. 2 It depicts a diagram showing an example of an arithmetic expression representing the designation of the unroll stage number and loop processing in an input source program.

FIG. 3 It depicts a diagram showing an example of arithmetic expressions generated by the generation unit.

FIG. 6 It depicts a diagram showing an example of processing time for one loop for each unroll stage number.

FIG. 7 It depicts a diagram showing an example of an arithmetic expression representing the designation of lower limit of the unroll stage number and upper limit of the unroll stage number, and loop processing in an input source program.

FIG. 8 It depicts a diagram showing an example of arithmetic expressions generated by the generation unit of the second example embodiment.

FIG. 12 It depicts a schematic block diagram showing a configuration example of a computer for a loop unrolling processing apparatus of each example embodiment of the present invention.

FIG. 13 It depicts a block diagram showing an overview of the loop unrolling processing apparatus of the present invention.

FIG. 14 It depicts a diagram showing an example of the original loop processing subject to loop unrolling.

FIG. 18 It depicts a specific example of the technique described in patent literature 1.

DESCRIPTION OF EMBODIMENT

Figure 4:
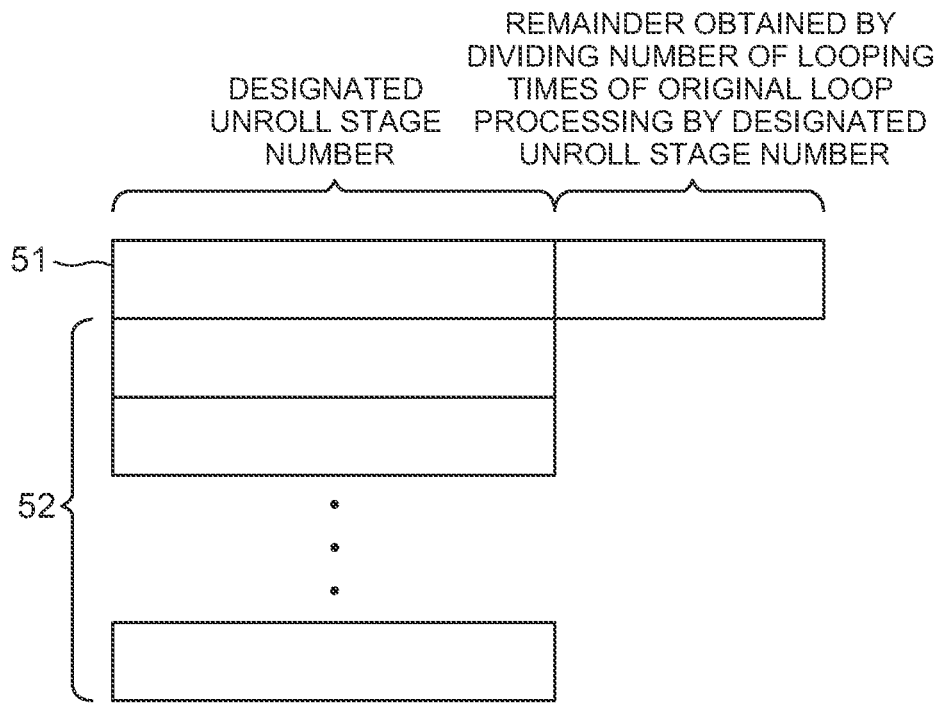
FIG. 4 It depicts a schematic diagram showing the processing represented by the arithmetic expression X2 and the processing represented by the arithmetic expression X3 that is executed afterwards.

The following is a description of example embodiments of the present invention with reference to the drawings.

A source program is input to a loop unrolling processing apparatus of each example embodiment of the present invention. Then, the loop unrolling processing apparatus of each example embodiment generates an arithmetic expression representing the result of loop unrolling for the loop processing in the source program. Then, the loop unrolling processing apparatus of each example embodiment replaces the arithmetic expression representing the loop processing in the source program with the generated arithmetic expression.

Example Embodiment 1

FIG. 1 is a block diagram representing an example of a loop unrolling processing apparatus of the first example embodiment of the present invention. The loop unrolling processing apparatus 1 of the first example embodiment includes an input unit 2, a specification unit 3, a generation unit 4, and a replacement unit 5.

The input unit 2 is an input device for obtaining a source program. For example, the input unit 2 is a data reading device that reads a source program recorded on a data recording medium such as an optical disk, but input unit 2 is not limited to such a data reading device.

It is assumed that the source program input to the loop unrolling processing apparatus 1 via input unit 2 includes loop processing.

The unroll stage number may also be designated in the input source program by a predetermined format.

The designation of the unroll stage number may be done separately from the input of the source program. For example, the unroll stage number may be designated by inputting the unroll stage number via a keyboard or other input device (not shown in FIG. 1) separately from the source program input.

The following example shows a case in which the unroll stage number is designated in the input source program by a predetermined format.

FIG. 2 is a diagram showing an example of an arithmetic expression representing the designation of the unroll stage number and loop processing in an input source program. The source program also includes arithmetic expressions other than those shown in FIG. 2.

The "#pragma unroll( )" shown in FIG. 2 is an example of a predetermined format for designating the unroll stage number. FIG. 2 shows an example of a case in which the unroll stage number is designated as "4" shown in parentheses in this format. The following explanation uses the case where the designated unroll stage number is 4 as an example. In the following explanation, the predetermined format for designating the unroll stage number is written immediately before the arithmetic expression that represents the original loop processing.

The specification unit 3 specifies the description part of an arithmetic expression that represents loop processing from the input source program. The loop processing is described by rules according to a programming language. The specification unit 3 may specify the arithmetic expression that matches the loop processing from the source program and specify the description part of the arithmetic expression. For example, in this example, it is assumed that the loop processing is described in the format "for ( ) { }". In this case, since the arithmetic expression from the second to fourth lines in FIG. 2 conforms to the "for ( ) { }" format, the specification unit 3 determines that the arithmetic expression from the second to fourth lines in FIG. 2 represents loop processing, and specifies the description part of the arithmetic expression.

Furthermore, when the unroll stage number is designated in the source program, the specification unit 3 also specifies the description part of a character string that designates the unroll stage number.

In this example, the specification unit 3 specifies the description part in the source program where the arithmetic expressions shown in FIG. 2 are written.

The generation unit 4 accepts the designation of the unroll stage number by referring to the character string described in the description part in the source program specified by the specification unit 3. In this example, the generation unit 4 accepts the designation of the unroll stage number "4" based on the character string in the predetermined format in the first line shown in FIG. 2.

The generation unit 4 may accept the designation of the unroll stage number by obtaining the unroll stage number input via a keyboard or other input device (not shown in FIG. 1).

In addition, for the loop processing described in the input source program (in this example, the loop processing represented by the arithmetic expression from line 2 to line 4 shown in FIG. 2), the generation unit 4 also generates arithmetic expressions representing the result of loop unrolling.

FIG. 3 is a diagram showing an example of arithmetic expressions generated by the generation unit 4. The arithmetic expressions illustrated in FIG. 3 include an arithmetic expression X1, an arithmetic expression X2, and an arithmetic expression X3.

The arithmetic expression X1 represents the exceptional case where the number of looping times N (see FIG. 2) of the original loop processing described in the input source program is less than the designated unroll stage number. Therefore, the processing represented by the arithmetic expression X1 is described below.

The following is an explanation of the processing represented by the arithmetic expression X2. The arithmetic expression X2 represents, when a remainder when dividing the number of looping times N of the original loop processing described in the source program by the designated unroll stage number is other than 0, executing processing of one loop with the sum of the remainder and the unroll stage number as the unroll stage number.

In the arithmetic expression X2, the remainder when the number of looping times N of the original loop processing is divided by the designated unroll stage number (4 in this example) is represented as "N %4". In this case, the non-zero remainder is "1," "2," or "3". Using the case where the remainder is 1 as an example, the sum of the remainder and the designated unroll stage number "4" is 1+4=5. Therefore, in this case, the arithmetic expression X2 represents executing processing of one loop with the unroll stage number of 5, as shown below.

```
{
A[i+0] = B[i+0] + C[i+0];
A[i+1] = B[i+1] + C[i+1];
A[i+2] = B[i+2] + C[i+2];
A[i+3] = B[i+3] + C[i+3];
A[i+4] = B[i+4] + C[i+4];
i+=5
}
```

Similarly, arithmetic expression X2 represents executing processing of one loop with the unroll stage number of 6 when the remainder is 2, and executing processing of one loop with the unroll stage number of 7 when the remainder is 3.

Moreover, the arithmetic expression shown in FIG. 3 represents that the processing represented by the arithmetic expression X2 is followed by the processing represented by the arithmetic expression X3. In addition, the arithmetic expression X2 represents that when N %4=0 (i.e., the remainder obtained by dividing the number of looping times N of the original loop processing by the designated unroll stage number is 0), no processing is executed, and the processing represented by the following arithmetic expression X3 is to be executed.

The processing represented by the arithmetic expression X3 represents loop processing with the designated unroll stage number.

FIG. 4 is a schematic diagram showing the processing represented by the arithmetic expression X2 and the processing represented by the arithmetic expression X3 that is executed afterwards.

The processing 51, shown schematically in FIG. 4, is the processing represented by the arithmetic expression X2 (see FIG. 3). The processing 51 is processing of one loop with the sum of the remainder and the designated unroll stage number as the unroll stage number, and the remainder is a remainder obtained by dividing the number of looping times of the original loop processing by the designated unroll stage number.

The processing 52, shown schematically in FIG. 4, is the processing represented by the arithmetic expression X3 (see FIG. 3). The processing 52 is executed after the processing 51. The processing 52 is loop processing with the designated unroll stage number.

When the remainder obtained by dividing the number of looping times of the original loop processing by the designated unroll stage number is 0, the processing 52 is executed without executing the processing 51.

Next, the processing represented by the arithmetic expression X1 shown in FIG. 3 is explained. The arithmetic expression X1 represents that when the number of looping times N of the original loop processing (see FIG. 2) described in the input source program is less than the designated unroll stage number, then loop processing same as the original loop processing is executed.

The arithmetic expressions X2 and onward represent the processing to be executed when the number of looping times of the original processing is greater than or equal to the designated unroll stage number. Therefore, when the processing represented by the arithmetic expression X1 is executed, the processing represented by the arithmetic expression X2 and the processing represented by the arithmetic expression X3 are not executed.

The arithmetic expressions X1, X2, and X3 (see FIG. 3) are examples. The specifics of X1, X2, and X3 will vary depending on the original loop processing. However, the generation unit 4 generates arithmetic expressions that include arithmetic expressions corresponding to each of the arithmetic expressions X1, X2, and X3.

In addition, when the number of looping times of the original loop processing described in the input source program is less than the designated unroll stage number, the generation unit 4 may define an arithmetic expression representing processing of one loop with the number of looping times as the unroll stage number, instead of the arithmetic expression corresponding to the arithmetic expression X1, and generate arithmetic expressions that include the arithmetic expression and arithmetic expressions corresponding to each of the arithmetic expressions X2, and X3.

The replacement unit 5 replaces the arithmetic expression in the description part in the source program specified by the specification unit 3 (i.e., the description part of the original loop processing) with the arithmetic expressions generated by the generation unit 4. When a character string in the predetermined format for designating the unroll stage number is written immediately before the arithmetic expression representing the original loop processing, the character string is also replaced with the arithmetic expressions generated by the generation unit 4.

For example, the specification unit 3, the generation unit 4, and the replacement unit 5 are realized by a central processing unit (CPU) of a computer that operates according to a loop unrolling processing program. For example, the CPU reads the loop unrolling processing program from a program storage medium such as a program storage device of the computer, and operates as the specific part 3, the generation unit 4, and the replacement unit 5 according to the loop unrolling processing program.

Figure 5:
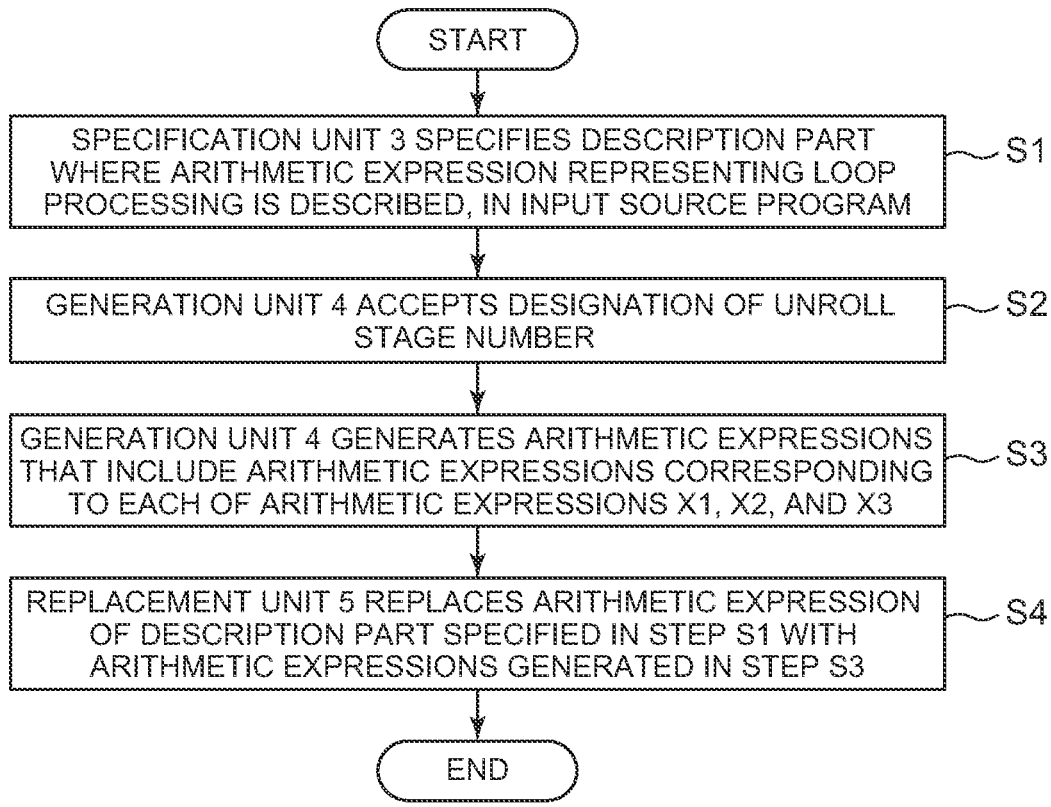
FIG. 5 It depicts a flowchart showing an example of the processing progress of the first example embodiment of the present invention.

Next, the processing progress of the first example embodiment of the present invention will be described. Matters that have already been explained will be omitted as appropriate. FIG. 5 is a flowchart showing an example of the processing progress of the first example embodiment of the present invention.

When a source program is input via input unit 2, the specification unit 3 specifies the description part where an arithmetic expression representing loop processing is described, in the input source program (step S1). When the specification unit 3 determines that the arithmetic expression representing the loop processing does not exist in the source program, the processing may be terminated at that point. This point is the same in the second example embodiment described below.

After step S1, the generation unit 4 accepts the designation of the unroll stage number (step S2).

Next, the generation unit 4 generates arithmetic expressions that include arithmetic expressions corresponding to each of the arithmetic expressions X1, X2, and X3 (see FIG. 3) (step S3).

Next, the replacement unit 5 replaces the arithmetic expression of the description part specified in step S1 with the arithmetic expressions generated in step S3 (step S4). When a character string in the predetermined format for designating the unroll stage number is written immediately before the arithmetic expression representing the original loop processing, the replacement unit 5 replaces that character string as well with the arithmetic expressions generated in step S3.

When there are multiple description parts of arithmetic expression representing loop processing in the input source program, it is sufficient to execute steps S1 to S4 for each description part.

As shown in FIG. 4, in the processing based on the result of loop unrolling in the present example embodiment, the processing 51 (see FIG. 4) of one loop with the sum of the remainder and the designated unroll stage number as the unroll stage number is executed, the remainder is obtained by dividing the number of looping times of the original loop processing by the designated unroll stage number, and followed by loop processing with the designated unroll stage number. Except in the case of exceptional processing as represented by the arithmetic expression X1 (see FIG. 3) or when 1 is designated as the unroll stage number, loop processing with the unroll stage number as 1 is not executed. Therefore, according to the present example embodiment, processing after loop unrolling can be made more efficient.

The technique described in patent literature 1 and the first example embodiment of the present application will be compared using specific numerical values. Assume that the processing time for one loop for each unroll stage number is the time shown in FIG. 6. Assume that the number of looping times in the original process is 7 and the designated unroll stage number is 4. In this case, the quotient of dividing 7 by 4 is 1 and the remainder is 3.

When the above example is applied to the technique in the patent literature 1, three loops with unroll stage number "1" are executed, and one loop with unroll stage number "4" is executed. In this case, the processing time is 4*3+4*1=16.

Assume the above example is applied to the first example embodiment of the present invention. In this case, one loop with 3+4=7 as the unroll stage number is executed. In this example, the process represented by the arithmetic expression X3 (see FIG. 3) is not executed because this processing completes the processing corresponding to the original loop processing. In this case, the processing time is 7*1=7.

Therefore, comparing the technique of the patent literature 1 with the first example embodiment of the present invention, the processing time for executing the processing of the loop unrolling result is shorter in the latter. Therefore, it can be said that the present example embodiment makes the processing after loop unrolling more efficient.

The value of the unroll stage number to be designated is determined, for example, by the programmer who creates the source program. In this case, the programmer may apply various unroll stage number to known loop unrolling technique (which may include the technique described in patent literature 1), then specify the unroll stage number that will give good performance, and designate the unroll stage number to the loop unrolling processing apparatus 1 in the present example embodiment.

Example Embodiment 2

In the first example embodiment, arithmetic expressions including an arithmetic expression (in the example shown in 3, arithmetic expression X2) which represents executing one loop with the sum of the remainder and the designated unroll stage number as the unroll stage number are generated, and the remainder is obtained by dividing the number of looping times of the original loop processing by the designated unroll stage number.

As mentioned earlier, increasing the unroll stage number too much tends to worsen performance. Therefore, when the sum of the remainder obtained by dividing the number of looping times of the original loop processing by the designated unroll stage number and the designated unroll stage number is too large, it may take longer to process one loop where the sum is the unroll stage number.

Therefore, in the second example embodiment of the present invention, the loop unrolling processing apparatus accepts the designation of the lower limit of the unroll stage number and the upper limit of the unroll stage number.

The loop unrolling processing apparatus of the second example embodiment of the present invention can be represented by the block diagram shown in FIG. 1, as can the loop unrolling processing apparatus of the first example embodiment, so FIG. 1 will be used to explain the second example embodiment.

The input unit 2 is the same as the input unit 2 in the first example embodiment.

The lower limit of the unroll stage number and the upper limit of the unroll stage number may be designated by a predetermined format in the source program input via input unit 2.

The designation of the lower limit of the unroll stage number and the upper limit of the unroll stage number may be done separately from the source program input. For example, the lower limit of the unroll stage number and the upper limit of the unroll stage number may be designated by inputting the lower limit of the unroll stage number and the upper limit of the unroll stage number via an input device such as a keyboard (not shown in FIG. 1), separately from inputting the source program.

The following example shows a case in which the lower limit of the unroll stage number and the upper limit of the unroll stage number are designated in the input source program using a predetermined format.

FIG. 7 is a diagram showing an example of an arithmetic expression representing the designation of lower limit of the unroll stage number and upper limit of the unroll stage number, and loop processing in an input source program. The source program also includes arithmetic expressions other than those shown in FIG. 7.

The "#pragma unroll(,)" shown in FIG. 7 is an example of a predetermined format for designating the lower limit of the unroll stage number and the upper limit of the unroll stage number. In FIG. 7, "8" and "11" shown in parentheses in this format are respectively the lower limit of the unroll stage number and the upper limit of the unroll stage number. In the following explanation, the predetermined format for designating the lower limit of the unroll stage number and the upper limit of the unroll stage number is written immediately before the arithmetic expression representing the original loop process.

The specification unit 3 specifies the description part of an arithmetic expression that represents loop processing from the input source program. This operation is the same as that of the specification unit 3 in the first example embodiment, and the explanation is omitted here.

Furthermore, when the lower limit of the unroll stage number and the upper limit of the unroll stage number are designated in the source program, the specification unit 3 also specifies the description part of the designation.

In this example, the specification unit 3 specifies the description part where the arithmetic expression shown in FIG. 7 is written in the source program.

The generation unit 4 accepts the designation of the lower limit of the unroll stage number and the upper limit of the unroll stage number by referring to a character string described in the description part in the source program specified by the specification unit 3. In this example, the generation unit 4 accepts "8" as the lower limit of the unroll stage number and "11" as the upper limit of the unroll stage number based on the character string in the predetermined format in the first line shown in FIG. 7.

The generation unit 4 may accept the designation of the lower limit of the unroll stage number and the upper limit of the unroll stage number by obtaining the values input via a keyboard or other input device (not shown in FIG. 1).

In addition, for the loop processing described in the input source program (in this example, the loop processing represented by the arithmetic expression from the second to fourth lines shown in FIG. 7), the generation unit 4 also generates arithmetic expressions representing the result of loop unrolling.

FIG. 8 is a diagram showing an example of arithmetic expressions generated by the generation unit 4 of the second example embodiment. In FIG. 8, some parts of the arithmetic expressions are omitted. The arithmetic expressions shown in FIG. 8 include an arithmetic expression Y0, an arithmetic expression Y1, and an arithmetic expression Y2. In addition, the arithmetic expression Y1 includes an arithmetic expression Y11 and an arithmetic expression Y12. The arithmetic expression Y2 includes an arithmetic expression Y21, an arithmetic expression Y22, and an arithmetic expression Y23.

In the following explanation, the number of looping times of the original loop processing described in the source program is denoted ad N. The designated lower limit of the unroll stage number is denoted as L, and the designated upper limit of the unroll stage number is M. Furthermore, the quotient obtained by dividing N by L is denoted as Q, and the remainder obtained by dividing N by L is denoted as R.

The arithmetic expression Y0 represents processing of substituting the designated lower limit of the unroll stage number to L, processing of substituting the designated upper limit of the unroll stage number to M, and processing of calculating Q and R.

The arithmetic expression Y1 represents processing when R−Q*(M−L)>0, and the arithmetic expression Y2 represents processing when R−Q*(M−L)>0 is not satisfied. In FIG. 8, R−Q*(M−L) is represented by a variable S.

First, the processing represented by the arithmetic expression Y2 is explained. As mentioned above, the arithmetic expression Y2 includes the arithmetic expression Y21, the arithmetic expression Y22, and the arithmetic expression Y23.

The following is an explanation of the processing represented by the arithmetic expression Y21. The arithmetic expression Y21 represents executing loop processing whose number of looping times is a quotient (described as R/(M−L) in FIG. 8) when R is divided by (M−L) with the unroll stage number as M.

The arithmetic expression Y2 represents executing processing represented by the arithmetic expression Y22 after the processing represented by the arithmetic expression Y21. The arithmetic expression Y22 represents, when a remainder (described as R % (M−L) in FIG. 8) when dividing R by (M−L) is other than 0, executing processing of one loop with the sum of the remainder and L as the unroll stage number.

The arithmetic expression Y2 represents executing processing represented by the arithmetic expression Y23 after the processing represented by the arithmetic expression Y23. The arithmetic expression Y23 represents executing loop processing with the unroll stage number as L.

The arithmetic expression Y22 represents, when a remainder when dividing R by (M−L) is 0, no processing is executed, and in this case the processing represented by the arithmetic expression Y23 is executed after the processing represented by the arithmetic expression Y21.

Figure 9:
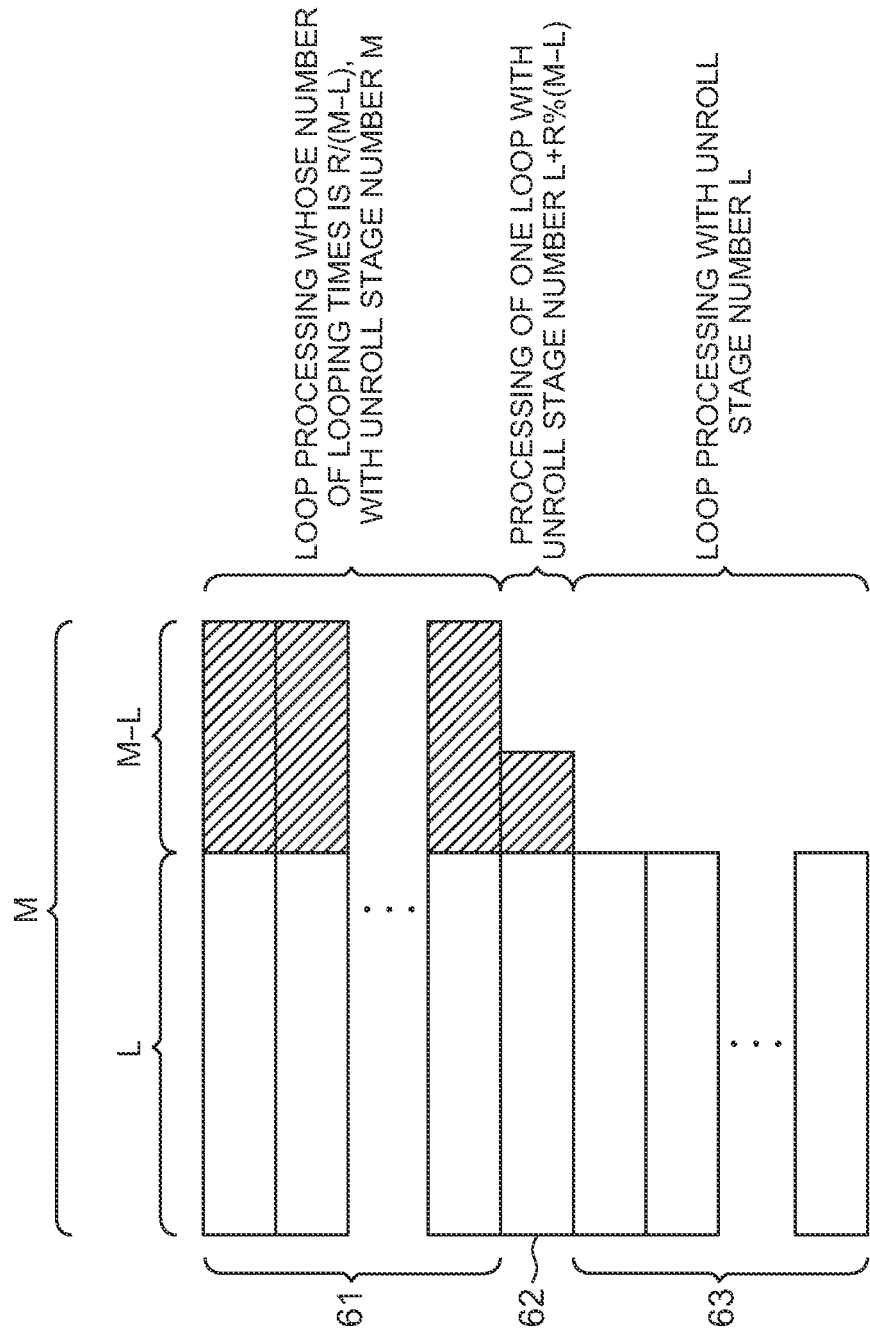
FIG. 9 It depicts a schematic diagram showing the processing represented by the arithmetic expression Y2.

FIG. 9 is a schematic diagram showing the processing represented by the arithmetic expression Y2.

The processing 61, shown schematically in FIG. 9, is the processing represented by the arithmetic expression Y21 (see FIG. 8) included in the arithmetic expression Y2. The processing 61 is loop processing whose number of looping times is R/(M−L), with the unroll stage number M. R/(M−L) is a quotient when R is divided by (M−L) which is an integer.

The processing 62, shown schematically in FIG. 9, is the processing represented by the arithmetic expression Y22 (see FIG. 8) included in the arithmetic expression Y2. The processing 62 is processing of one loop with the unroll stage number L+R % (M−L). R % (M−L) is a remainder when R is divided by (M−L).

The processing 63, shown schematically in FIG. 9, is the processing represented by the arithmetic expression Y23 (see FIG. 8) included in the arithmetic expression Y2. The processing 63 is executed after the processing 62. The processing 63 is loop processing with the unroll stage number L.

When R % (M−L) is 0, the processing 62 is not executed after the processing 61, and the processing 63 is executed.

In the processing represented by the arithmetic expression Y2 (see FIGS. 8 and 9), it can be said that processing corresponding to processing of stage number R is divided into processing of stage number (M−L) and processing of stage number (M−L) is distributed to each loop of the loop processing. Moreover, processing corresponding to the remainder where the processing corresponding to the processing of stage number R is divided into processing of stage number (M−L) is distributed to one loop of the processing 62. Moreover, the processing 63 is loop processing without such distribution.

Next, the processing represented by the arithmetic expression Y1 (see FIG. 8) is explained. As mentioned above, the arithmetic expression Y1 includes the arithmetic expression Y11 and the arithmetic expression Y12.

The arithmetic expression Y1 represents processing of a case where the remainder R when the number of looping times N of the original loop processing is divided by the lower limit of the unroll stage number L is too large to be distributed to each loop of loop processing.

For example, suppose N=7, L=4, and M=6. In this case, Q=7/4=1 and R=7%4=3. Q=1 means that the number of looping times is one. Therefore, processing corresponding to stage number (M−L) (i.e., stage number two) can only be distributed to one loop, and all processing corresponding to stage number 3 cannot be distributed. The arithmetic expression Y1 represents the exceptional processing in the case of such a situation in this example.

The arithmetic expression Y11 (see FIG. 8) included in the arithmetic expression Y1 represents executing processing corresponding to one loop of the original loop processing, R−Q*(M−L) times. As in the above example, N=7, L=4, M=6, Q=1, and R=3, then R−Q*(M−L)=3−1*(6−4)=1. Thus, in the above example, processing corresponding to one loop of the original loop processing is executed once.

The arithmetic expression Y1 shown in FIG. 8 represents executing the processing represented by the arithmetic expression Y12 after the processing represented by the arithmetic expression Y11. The arithmetic expression Y12 represents executing loop processing with the unroll stage number M. In the above example, when the unroll stage number is M, the number of looping times of the loop processing is one.

Figure 10:
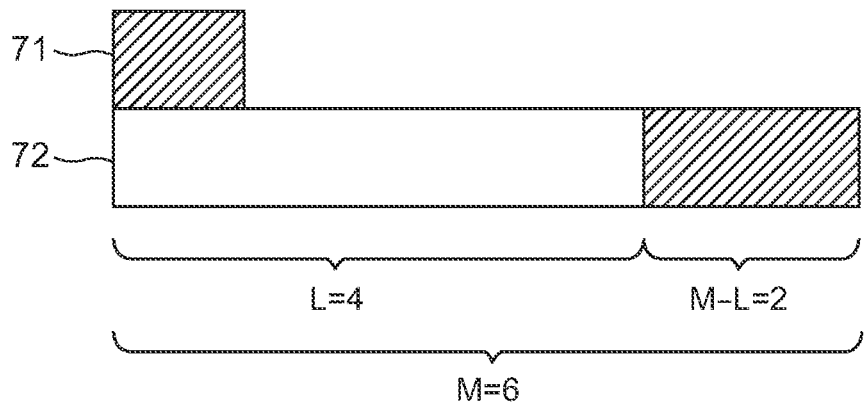
FIG. 10 It depicts a schematic diagram showing the processing represented by the arithmetic expression Y1.

Thus, the processing represented by the arithmetic expression Y1 in the above example case is represented in FIG. 10. The process 71 is processing corresponding to one loop of the original loop processing, R−Q*(M−L)=1 time. The processing 72 is the loop processing with the unroll stage number as M=6. However, in this example, the number of looping times in the processing 72 is one.

The arithmetic expressions Y0, Y1, and Y2 shown in FIG. 8 are examples. The specifics of Y0, Y1, and Y2 will vary depending on the original loop processing. However, the generation unit 4 of the second example embodiment generates arithmetic expressions that include arithmetic expressions corresponding to each of the arithmetic expressions Y0, Y1, and Y2.

The replacement unit 5 replaces the arithmetic expression in the description part in the source program specified by the specification unit 3 (i.e., the description part of the original loop processing) with the arithmetic expressions generated by the generation unit 4. When a character string in the predetermined format for designating the lower limit of the unroll stage number and the upper limit of the unroll stage number is written immediately before the arithmetic expression representing the original loop processing, the character string is also replaced with the arithmetic expressions generated by the generation unit 4.

Figure 11:
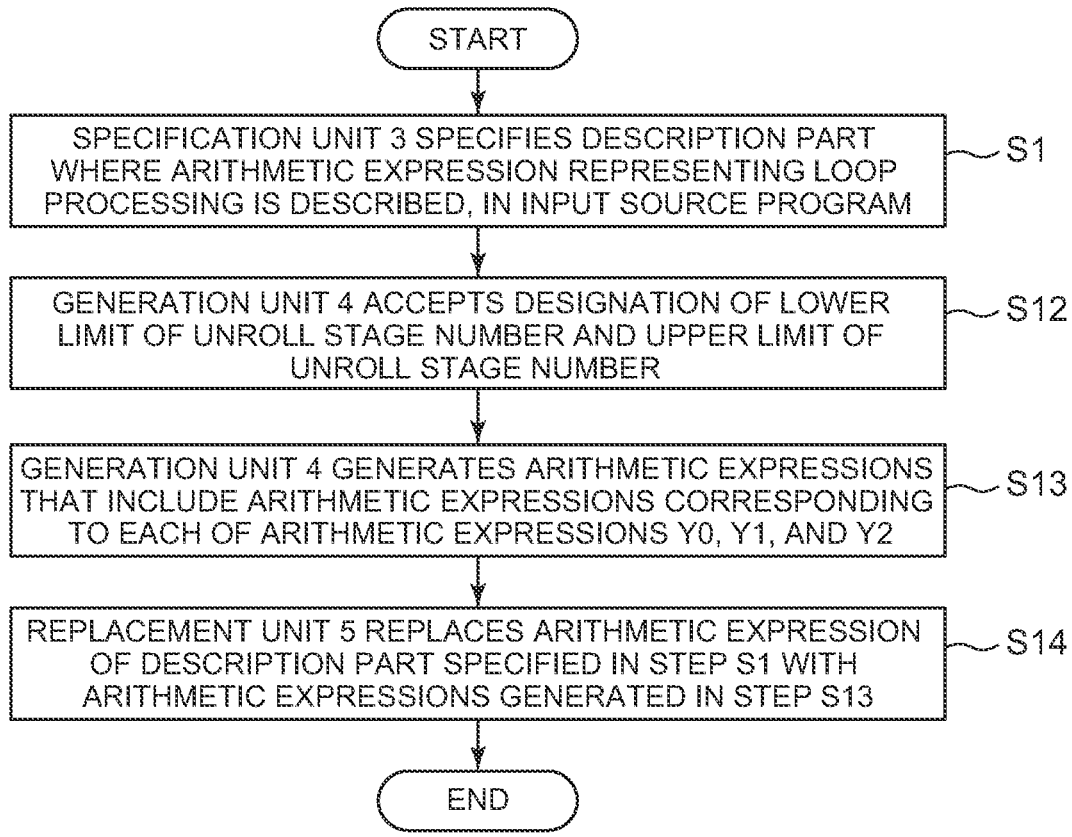
FIG. 11 It depicts a flowchart showing an example of the processing progress of the second example embodiment of the present invention.
Figures 15, 16, 17:
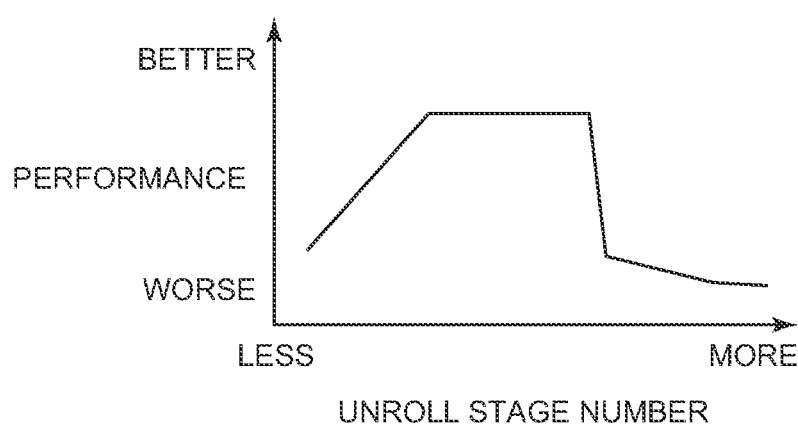
FIG. 15 It depicts an example of a result of loop unrolling for the loop processing shown in FIG. 14 with the unroll stage number 4.
FIG. 16 It depicts another example of a result of loop unrolling for the loop processing shown in FIG. 14 with the unroll stage number 4.
FIG. 17 It depicts a schematic diagram showing a trend in the relationship between the unroll stage number and a performance of the program when loop unrolling is performed.

Next, the processing progress of the second example embodiment of the present invention will be described. Matters that have already been explained will be omitted as appropriate. FIG. 11 is a flowchart showing an example of the processing progress of the second example embodiment of the present invention.

When a source program is input via input unit 2, the specification unit 3 specifies the description part where an arithmetic expression representing loop processing is described, in the input source program (step S1). Step S1 is the same as step S1 in the first example embodiment (see FIG. 5).

After step S1, the generation unit 4 accepts the designation of the lower limit of the unroll stage number and the upper limit of the unroll stage number (step S12).

Next, the generation unit 4 generates arithmetic expressions that include arithmetic expressions corresponding to each of the arithmetic expressions Y0, Y1, and Y2 (see FIG. 8) (step S13).

Next, the replacement unit 5 replaces the arithmetic expression of the description part specified in step S1 with the arithmetic expressions generated in step S13 (step S14). When a character string in the predetermined format for designating the lower limit of the unroll stage number and the upper limit of the unroll stage number is written immediately before the arithmetic expression representing the original loop processing, the replacement unit 5 replaces that character string as well with the arithmetic expressions generated in step S13.

When there are multiple description parts of arithmetic expression representing loop processing in the input source program, it is sufficient to execute steps S1 to S14 for each description part.

As shown in FIG. 9, in the processing based on the result of loop unrolling in the present example embodiment, loop processing whose number of looping times is the quotient with the unroll stage number M is executed. The quotient is a quotient when R is divided by (M−L). After that, the processing of one loop with the sum of the remainder and the lower limit of the unroll stage number L as the unroll stage number is executed. The remainder is a remainder when R is divided by (M−L). After that, the loop processing with the unroll stage number L is executed.

Therefore, except in the case of processing corresponding to stage number R cannot be distributed to each loop of loop processing or when 1 is designated as the lower limit of the unroll stage number, loop processing with the unroll stage number as 1 is not executed. Therefore, according to the present example embodiment, processing after loop unrolling can be made more efficient.

Furthermore, in the present embodiment, the unroll stage number is never larger than the upper limit, M. Therefore, it is possible to prevent the performance of the execution program from deteriorating due to the unroll stage number becoming too large.

In each example embodiment, the loop unrolling processing apparatus 1 may record the rewritten source program on a data recording medium after step S4 (see FIG. 5) or after step S14 (see FIG. 11). The loop unrolling processing apparatus 1 may also generate an execution program based on the rewritten source program.

FIG. 12 is a schematic block diagram showing a configuration example of a computer for a loop unrolling processing apparatus of each example embodiment of the present invention. For example, computer 1000 includes a CPU 1001, a main memory 1002, an auxiliary memory 1003, interface 1004, and a data reading device 1005 that reads a source program recorded on a data recording medium.

The loop unrolling processing apparatus 1 of each example embodiment of the present invention is realized by a computer 1000. The operation of the loop unrolling processing apparatus 1 is stored in the form of a program (a loop unrolling processing program) in the auxiliary memory 1003. The CPU 1001 reads the program from the auxiliary memory 1003, deploys the program to the main memory 1002, and executes the processing described in above each example embodiment according to the program. In this case, the input unit 2 is realized by the data reader 1005. The specification unit 3, the generation unit 4, and the replacement unit 5 are realized by the CPU 1001.

The auxiliary memory 1003 is an example of a non-transitory tangible medium. Other examples of non-transitory tangible media are a magnetic disk, an optical magnetic disk, a CD-ROM (Compact Disk Read Only Memory), a DVD-ROM (Digital Versatile Disk Read Only Memory), a semiconductor memory, and the like, which are connected through the interface 1004. When the program is delivered to the computer 1000 through a communication line, the computer 1000 that receives the delivery may develop the program into the main memory 1002 and executes the processing of each example embodiment according to the program.

Some or all of the components may be realized by general-purpose or dedicated circuitry, processors, or a combination of these. They may be configured by a single chip or by multiple chips connected via a bus. Some or all of the components may be realized by a combination of the above-mentioned circuitry, etc. and a program.

When some or all of each component is realized by multiple information processing devices, circuits, etc., the multiple information processing devices, circuits, etc. may be centrally located or distributed. For example, the information processing devices, circuits, etc. may be implemented as a client-and-server system, a cloud computing system, etc., each of which is connected via a communication network.

The following is an overview of the invention. FIG. 13 is a block diagram showing an overview of the loop unrolling processing apparatus of the present invention. The loop unrolling processing apparatus includes a specification unit 3, a generation unit 4, and a replacement unit 5.

The specification unit 3 specifies a description part of an arithmetic expression that represents loop processing from an input source program.

The generation unit 4 generates arithmetic expressions that represent executing, when a remainder when dividing the number of looping times of the loop processing by a designated unroll stage number is other than 0, processing of one loop with a sum of the remainder and the designated unroll stage number as a unroll stage number, and executing loop processing with the designated unroll stage number after the processing of one loop.

The replacement unit 5 replaces the arithmetic expression of the description part specified by the specification unit 3 with the arithmetic expressions generated by the generation unit 4.

Such a configuration makes the processing after loop unrolling more efficient.

The generation unit 4 may generate, when the number of looping times of the loop processing described in the input source program is less than the designated unroll stage number, the arithmetic expressions that include an arithmetic expression that represents loop processing same as the loop processing.

The generation unit 4 may generate, when the number of looping times of the loop processing described in the input source program is less than the designated unroll stage number, the arithmetic expressions that include an arithmetic expression that represents processing of one loop with the number of looping times as the unroll stage number.

The generation unit 4 may accept designation of the unroll stage number according to a predetermined format described in the input source program.

The generation unit 4 shown in FIG. 13 may also perform the following operations. That is, the generation unit 4 may generate arithmetic expressions. Here, N denotes the number of looping times of the loop processing. L denotes a designated lower limit of unroll stage number. M denotes a designated upper limit of the unroll stage number. Q denotes a quotient obtained by dividing N by L. R denotes a remainder obtained by dividing N by L. The arithmetic expressions include an arithmetic expression that represents executing processing corresponding to one loop of the loop processing $R-Q*(M-L)$ times when $R-Q*(M-L)>0$, and then executing loop processing with the unroll stage number M, and an arithmetic expression that represents executing loop processing whose number of looping times is a quotient obtained by dividing R by $(M-L)$, with the unroll stage number M when $R-Q*(M-L)>0$ is not satisfied, and then executing, when a remainder obtained by dividing R by $(M-L)$ is other than 0, processing of one loop with sum of the remainder and L as the unroll stage number, and then executing loop processing with the unroll stage number L.

In this case, the generation unit 4 may accept designation of the lower limit of the unroll stage number and the upper limit of the unroll stage number according to a predetermined format described in the input source program.

Although the invention of the present application has been described above with reference to the example embodiments, the present invention is not limited to the above example embodiments. Various changes can be made to the configuration and details of the present invention that can be understood by those skilled in the art within the scope of the present invention.

INDUSTRIAL APPLICABILITY

The present invention is suitably applicable to loop unrolling processing apparatus, methods and programs that perform loop unrolling for loop processing described in a source program.

REFERENCE SIGNS LIST

1 Loop unrolling processing apparatus
2 Input unit
3 Specification unit
4 Generation unit
5 Replacement unit

What is claimed is:

1. A loop unrolling processing apparatus comprising:
a memory configured to store instructions; and
a processor configured to execute the instructions to:
specify a description part of an arithmetic expression that represents loop processing from an input source program; and
generate arithmetic expressions,
wherein N denotes a number of looping times of the loop processing, L denotes a designated lower limit of unroll stage number, M denotes a designated upper limit of the unroll stage number, Q denotes a quotient obtained by dividing N by L, and R denotes a remainder obtained by dividing N by L,
wherein the arithmetic expressions include:
an arithmetic expression that represents executing processing corresponding to one loop of the looping times of the loop processing when $R-Q*(M-L)>0$, and then executing loop processing with the unroll stage number M, and
an arithmetic expression that represents executing the loop processing whose number of looping times is a quotient obtained by dividing R by $(M-L)$, with the unroll stage number M when $R-Q*(M-L)>0$ is not satisfied, and then executing, when a remainder obtained by dividing R by $(M-L)$ is other than 0, processing of one loop with sum of the remainder and L as the unroll stage number, and then executing loop processing with the unroll stage number L, and
wherein the processor is further configured to execute the instructions to:
replace the arithmetic expression of the specified description part with the generated arithmetic expressions; and
record the source program with the replaced arithmetic expression on a data recording medium,
wherein a processing time of the source program with the replaced arithmetic expression is shorter than a processing time of the input source program.

2. The loop unrolling processing apparatus according to claim 1, wherein
the processor is further configured to execute the instructions to accept designation of the lower limit of the unroll stage number and the upper limit of the unroll stage number according to a predetermined format described in the input source program.

3. A loop unrolling processing method comprising:
specifying a description part of an arithmetic expression that represents loop processing from an input source program;
generating arithmetic expressions,
where N denotes a number of looping times of the loop processing, L denotes a designated lower limit of unroll stage number, M denotes a designated upper limit of the unroll stage number, Q denotes a quotient obtained by dividing N by L, and R denotes a remainder obtained by dividing N by L,
wherein the arithmetic expressions include:
an arithmetic expression that represents executing processing corresponding to one loop of the loop looping times of the processing when R−Q*(M−L)>0, and then executing loop processing with the unroll stage number M, and an arithmetic expression that represents executing the loop processing whose number of looping times is a quotient obtained by dividing R by (M−L), with the unroll stage number M when R−Q*(M−L)>0 is not satisfied, and then executing, when a remainder obtained by dividing R by (M−L) is other than 0, processing of one loop with sum of the remainder and L as the unroll stage number, and then executing loop processing with the unroll stage number L;

replacing the arithmetic expression of the specified description part with the generated arithmetic expressions; and recording the source program with the replaced arithmetic expression on a data recording medium, wherein a processing time of the source program with the replaced arithmetic expression is shorter than a processing time of the input source program.

4. A non-transitory computer-readable recording medium in which a loop unrolling processing program is recorded, the loop unrolling processing program causing a computer to execute:

a specification process of specifying a description part of an arithmetic expression that represents loop processing from an input source program;

a generation process of generating arithmetic expressions, where N denotes a number of looping times of the loop processing, L denotes a designated lower limit of unroll stage number, M denotes a designated upper limit of the unroll stage number, Q denotes a quotient obtained by dividing N by L, and R denotes a remainder obtained by dividing N by L, wherein the arithmetic expressions include:

an arithmetic expression that represents executing processing corresponding to one loop of the looping times of the loop processing when R−Q*(M−L)>0, and then executing loop processing with the unroll stage number M, and an arithmetic expression that represents executing the loop processing whose number of looping times is a quotient obtained by dividing R by (M−L), with the unroll stage number M when R−Q*(M−L)>0 is not satisfied, and then executing, when a remainder obtained by dividing R by (M−L) is other than 0, processing of one loop with sum of the remainder and L as the unroll stage number, and then executing loop processing with the unroll stage number L, and a replacement process of replacing the arithmetic expression of the description part specified in the specification process with the arithmetic expressions generated in the generation process; and a recording process of recording the source program with the replaced arithmetic expression on a data recording medium, wherein a processing time of the source program with the replaced arithmetic expression is shorter than a processing time of the input source program.

* * * * *